United States Patent Office 3,248,234
Patented Apr. 26, 1966

3,248,234
GLASS COMPOSITIONS
Yves Georges Godron, Paris, France, assignor to Compagnie de Saint-Gobain, Neuilly-sur-Seine, France
No Drawing. Filed Dec. 18, 1961, Ser. No. 165,056
Claims priority, application France, Feb. 12, 1955, 685,510; May 11, 1955, 55,383, Patent 1,121,660
10 Claims. (Cl. 106—47)

This invention relates to new glasses, to new compositions of matter adapted to use in making glass, and to novel uses for such glass compositions. This case is a continuation-in-part of application Ser. No. 563,185, filed February 3, 1956, now abandoned.

It is an object of the invention to make non-siliceous glass or glass containing only little quantities of silica and and impurities. Another object of the invention is to make a class of novel glasses the physical and chemical characteristics of which can be varied to produce different qualities. Thus, by adjustment of the quantity of certain elements present, or by the substitution of elements, it is possible to alter the fusibility, the resistance to chemical attack, or the tendency of the glass to devitrification. Further, by making other changes, it is possible to increase or to reduce the resistance of the glass to chemical agents and atmospheric conditions.

Another object of the invention is to produce glasses suitable as enamels. It has been heretofore difficult to apply enamels to aluminum and its alloys and this object includes the production of glasses suitable for enameling those metals. Heretofore, many glasses used in enameling were rich in lead and consequently toxic. It is an object of this invention to produce glasses suitable for enameling which are non-toxic.

Another object of the invention is to make high pressure lubricants suitable for use in the drawing of metals through dies and in other high temperature and high pressure operations involving friction, and particularly for use in the drawing of metals including alloys which have relatively low points of fusion.

Another object is to make and use glasses as fertilizers and to prepare glassy fertilizers susceptible of good control of the rate of disintegration.

The objects are accomplished generally speaking by glass having as its three essential integredients alkali metal oxide, $P_2O_5$ and $Al_2O_3$, in the proportion of 25 to 58% of alkali metal oxide, 29 to 68% of $P_2O_5$ and 2 to 20% of $Al_2O_3$, the $P_2O_5$ being from 40 to 68% when alkali metal oxide is from 25 to 50% and from 29 to 48% when alkali metal oxide is higher than 50%, and the $Al_2O_3$ being from 2 to 10% when alkali metal oxide is from 25 to 50% and from 2 to 20% when alkali metal oxide is higher than 50%, the percentages being expressed as mole percents of the total of the three ingredients, the ratio between the moles of $P_2O_5$ and of $Al_2O_3$ being not less than 1.5 to 1 and the content of $Al_2O_3$ being less than 20% by weight of the glass. The total amount of silica and impurities such as $T_iO_2$, $SO_3$ et al., is less than 4% by weight of the glass.

In a general manner, the ratio of the moles of $P_2O_5$ to the moles of $Al_2O_3$ is equal or superior to 1.5. It is preferred practically, when the alkali metal oxide content is higher than 50 moles percent, to maintain the content of phosphoric anhydride equal or superior to 34.5 moles percent in order to make the glasses without special precautions. When the phosphoric anhydride attains these values the rate of crystallization and consequently the rate of devitrification are perfectly compatible with the usual methods of making glass.

The preferred alkali metal oxide is sodium oxide ($Na_2O$). One can use also a mixture of sodium oxide ($Na_2O$) and potassium oxide ($K_2O$) or a mixture of sodium oxide, potassium oxide and lithium oxide ($Li_2O$). If desired, other alkali metal oxides, or mixtures of them, may also be utilized. By changing the percentages of the various alkali metal oxides in the composition, one may change the fusibility, the alterability, or the tendency toward devitrification.

In particular, the vitrification of the new glasses which have a high content in alkali, that is above 52%, and a low content in $P_2O_5$, below 30%, can be obtained by using a mixture of sodium oxide and potassium oxide, for instance in proportions of 1 mole of potassium oxide for 6 moles of sodium oxide.

To increase the resistance of these glasses to chemical and atmospheric agents, it is possible to replace a small quantity of phosphoric anhydride, for example 5%, with boric anhydride $B_2O_3$. It is preferred to make said substitution of $P_2O_5$ by $B_2O_3$ without lowering the minimum mole percentages of $P_2O_5$ so that the ratio between the molecular percent of $P_2O_5$ and the molecular percent of $Al_2O_3$ remains at least equal to 1.5. A substitution of up to 5% produces a progressive and effective change in quality of the product. The $B_2O_3$ is always less than 10% by weight of the total composition and preferably less than about 5% by weight of the total composition.

In order to modify the viscosity of the glass or its attackability, some of the sodium oxide or other alkali metal oxide or the phosphoric anhydride may be replaced by oxides of divalent metal such as calcium oxide, CaO, magnesium oxide, MgO, and zinc oxide, ZnO, in a proportion up to 20 mole percent. It is preferred to make said substitution without lowering the minimum mole percentages of alkali metal oxide and phosphoric anhydried. When alkali metal oxide is from 25 to 50% the $Al_2O_3$ content must be less than $$\frac{10 \times (100-d)}{100}$$

$d$ being the content of divalent metal oxide.

The glasses falling within the general formula may also be modified by replacing a small amount of any or all of the basic constituents, for instance up to about 5%, by oxides of the group $R_2O_3$ in which $R_2O_3$ is a metal oxide of the type of iron oxide and chromium oxide. It is prefered to make said substitution without lowering the minimum mole percentages of said basic constituents. $R_2O_3$ as used herein excludes $Al_2O_3$ which is possessed of special properties and is a basic constituent.

We have demonstrated that, generally speaking the alkali phosphoric aluminous glasses of these formulas have the property of sintering at a relatively low temperature which gives them ease of preparation and a low temperature field of use.

The softest glasses are found among those which have low contents in alumina and medium percentages of phosphoric anhydride, medium referring to the medium values in the foregoing formulas. For example, glasses having the following compositions:

|           | $P_2O_5$ | $Al_2O_3$ | $Na_2O$ |
|-----------|----------|-----------|---------|
| Example 1 | 44.5     | 2.9       | 52.6    |
| Example 2 | 49       | 3.0       | 48.0    | have a sintering temperature about 330° C.

The glasses become harder when the contents of said ingredients departs from the medium range of $P_2O_5$ and low $Al_2O_3$. The increase in the temperature of sintering might, within the general formula, attain 150° C. For example, the following glass had a sintering temperature of 480° C.

|           | $P_2O_5$ | $Al_2O_3$ | $Na_2O$ | $K_2O$ |
|-----------|----------|-----------|---------|--------|
| Example 3 | 29.4     | 18.2      | 45.0    | 7.4    |

This glass has a low phosphoric anhydride content and the ratio of moles of sodium oxide to moles of potassium oxide is on the order of 6 to 1.

The substitution of potassium oxide for sodium oxide modifies the fusibility of the glass, which becomes more fusible as the proportion of potassium oxide is increased. The following table shows examples of compositions of decreasing sintering temperature, the only variation in the glasses being the relative quantity of sodium oxide to potassium oxide. The ability to control sintering temperature is valuable as it enables the glass to be fitted to its use.

|           | $P_2O_5$ | $Al_2O_3$ | $Na_2O$ | $K_2O$ | Temp. of sintering, °C. |
|-----------|----------|-----------|---------|--------|-------------------------|
| Example 4 | 40.65    | 4.75      | 54.6    | 0      | 380                     |
| Example 5 | 40.65    | 4.75      | 46.9    | 7.7    | 350                     |
| Example 6 | 40.65    | 4.75      | 41.0    | 13.6   | 330                     |
| Example 7 | 40.65    | 4.75      | 23.5    | 31.1   | 315                     |

The variation in viscosity which can be obtained by substituting divalent metal oxides for alkali oxide appears in the following table, which relates to substitutions in a glass wherein the percentages of $P_2O_5$ and $Al_2O_3$ are maintained constant. The temperatures shown are those which correspond to a value of the viscosity attained when the peaks of grains of glass of .30 to .35 mm. start to round off in 30 sec. at the temperature of equilibrium.

|            | $P_2O_5$ | $Al_2O_3$ | $Na_2O$ | ZnO  | MgO   | Temp., °C. |
|------------|----------|-----------|---------|------|-------|------------|
| Example 8  | 40.7     | 4.75      | 54.55   |      |       | 420        |
| Example 9  | 40.7     | 4.75      | 48.55   | 6.00 |       | 430        |
| Example 10 | 40.7     | 4.75      | 42.65   |      | 11.90 | 460        |

It is seen from this table that the substitution of oxides of divalent metals for alkali oxide increases the viscosity. On the other hand, the substitution of the same materials for phosphoric anhydride acts in an inverse sense, but in a less pronounced way.

It should be noted that, according to an important feature of the invention, all the glasses of Examples 1 to 10 have an alumina content less than 20% by weight.

The glasses according to the invention are attacked by water, as measured by the method of the Deutsche Glass Technische Gesellschaft, which varies in considerable proportions, from 10 units to several thousands. Those which are least attackable may be advantageously applied in enameling, particularly on aluminum and its alloys, which are difficult to enamel. In fact, without it being necessary to introduce lead oxide into their composition, they are as fusible as the enamels rich in lead, and are not toxic.

Many of the glasses falling within this invention have fertilizing properties either as direct fertilizers, because of their content of $P_2O_5$ and $K_2O$, or as adjuvants because of their CaO and MgO content, or as supports of minor elements (ZnO), and are thus very useful in agriculture. As a large range of attackability is offered by these glasses, one may choose among them as a function of their solubility the fertilizers or supports which are best adapted to the needs of a particular soil.

Additional examples of the first and second groups are as follows:

*Example 11*

The following ingredients were melted at 1000° C. in a crucible of silico aluminous refractory and poured on a table; they correspond substantially to the composition of Example 4.

Parts by weight
Hydrated trisodium phosphate _____ 122.5
Diammonia phosphate _____ 62.6
Hydrated alumina _____ 7.65

*Example 12*

The procedure of Example 11 was followed and the composition obtained was substantially that of Example 9. The following ingredients were melted together.

Parts by weight
Hydrated trisodium phosphate _____ 108
Sodium phosphate _____ 66.9
Hydrated alumina _____ 7.55
Zinc oxide _____ 4.95

*Example 13*

The following ingredients were melted at 1000° C. and poured on a table.

Parts by weight
Hydrated trisodium phosphate _____ 105.2
Diammonia phosphate _____ 63.7
Hydrated alumina _____ 7.65
Dolomite _____ 17.4

This glass sintered at 465° C. corresponding substantially to the following composition:

Phosphoric anhydride ($P_2O_5$) _____ 36.5
Alumina ($Al_2O_3$) _____ 4.4
Lime (CaO) _____ 8.6
Magnesia (MgO) _____ 8.3
Sodium oxide ($Na_2O$) _____ 42.2

It is known that the drawing of non ferrous metals and alloys presents great difficulties which arise principally from the high friction which develops between the ingot and the parts of the press. These high degrees of friction develop local rises in the temperature of the ingot and these produce defects in the drawn pieces. Furthermore, by reason of this friction, the central part of the ingot moves faster than the parts in contact with the tools of the press and it follows that local high tensions are produced and a heterogeneity of structure which is characterized by the appearance of large grains in the periphery of the drawn product. It is particularly noticeable that there is produced a central recess in the rear part of the drawn piece and that this recess may attain 20% of the total length of the drawn product.

The classical method of improving these conditions consists in considerably reducing the speed of drawing, reducing it to below 3 meters per minute in order to permit the heat released by friction to dissipate itself in the machinery. Now, in addition to lowering the productivity of the press, this method does not permit one to avoid the appearance of large external grains in the periphery nor the formation of a central cavity.

There has been described in a non-anticipatory way, a process of drawing, at higher temperature, of metals which are hard to draw, in which one interposes between the ingot and the tools of the press, in particular the die, some material which will melt partially or wholly under the effect of the heat of the ingot, while remaining viscous, examples of which are glass, an oxide, a salt or a slag.

The applicant has demonstrated, and this constitutes another object of the present invention, that the compositions of glass according to the foregoing description have a viscosity which makes them suitable for use as lubricants in the temperature interval between about 350 and 650° C. and that they may be used as drawing lubricants for metals or alloys of low fusion point, and particularly for aluminum and aluminum alloys. For those alloys, the temperature attained by the lubricant during the drawing is within that interval. The sintering temperature of these compositions is itself between about 320 and 500° C.

In applying the glasses described herein to the drawing of metals, one obtains interesting results. The metals may be drawn at high speed, particularly the light alloys, specifically mentioned herein, the speeds of drawing attaining from 15 to 50 meters per minute; large grains do not appear in the periphery, the drawing is accomplished without the production of a hollow part in the rod, so that the extruded piece is solid from end to end.

The glasses utilized have the advantage of easy removal from the surface of the object. This is accomplished by simple immersion in water. In certain cases, notably when the glasses contain zinc oxide, one may slightly acidify the water which is used for washing, for instance, by the addition of a small amount of nitric acid.

Example 14

In order to draw an aluminum alloy containing .9% by weight silicon and .7% by weight magnesium, a glass was used as a lubricant at the die containing $P_2O_5$: 29.4 moles percent; $Al_2O_3$: 18.3 moles percent; $Na_2O$: 44.8 moles percent; $K_2O$: 7.5 moles percent. The sintering temperature of this glass was near 485° C. The extrusion speed was 12 meters per minute.

Example 15

To extrude an alloy of aluminum containing the following percentages by weight:

| | |
|---|---|
| Cu | 1.6 |
| Mg | 2.5 |
| Mn | 0.2 |
| Zn | 5.6 |
| Cr | 0.3 | a lubricant of the following composition was employed:

| | Moles percent |
|---|---|
| $P_2O_5$ | 46.2 |
| $Al_2O_3$ | 5 |
| $Na_2O$ | 48.8 |

The sintering temperature was 370° C. The extrusion speed was 18 meters per minute.

None of the extruded bodies recited in the foregoing examples had a central cavity and, at the conclusion of the subsequent heat treatment, there were no large grains in the periphery of the objects.

As many apparently widely different embodiments of the present invention may be made without departing from the spirit and scope hereof, it is to be understood that the invention is not limited to the specific embodiments.

What is claimed is:

1. Non-toxic glass having as its three essential ingredients alkali metal oxide, $P_2O_5$, and $Al_2O_3$, in the proportion of 25 to 58% of alkali metal oxide, 29 to 68% of $P_2O_5$ and 2 to 20% of $Al_2O_3$, the $P_2O_5$ being from 40 to 68% when alkali metal oxide is from 25 to 50% and from 29 to 48% when alkali metal oxide is higher than 50%, and the $Al_2O_3$ being from 2 to 10% when alkali metal oxide is from 25 to 50% and from 2 to 20% when alkali metal oxide is higher than 50%, the percentages being expressed as mole percents of the total of the three ingredients, the ratio between the moles of $P_2O_5$ and $Al_2O_3$ being not less than 1.5 to 1 and the content of $Al_2O_3$ being less than 20% by weight of the glass the total impurities being less than 4% of the weight of the glass.

2. Non-toxic glass having as its three essential ingredients alkali metal oxide, $P_2O_5$, and $Al_2O_3$, the relative proportions of the three ingredients expressed as mole percent of the total of the three ingredients being $P_2O_5$ 29 to 48%, alkali metal oxide above 50 to 58%, and $Al_2O_3$ from 2 to 20%, the ratio between the moles of $P_2O_5$ and $Al_2O_3$ being not less than 1.5 to 1 and the content of $Al_2O_3$ being less than 20% by weight of the glass the total impurities being less than 4% of the weight of the glass.

3. Non-toxic glass having as its three essential ingredients alkali metal oxide, $P_2O_5$, and $Al_2O_3$, the relative proportions of the three ingredients expressed as mole percent of the total of the three ingredients being $P_2O_5$ 40 to 68%, alkali metal oxide 25 to 50%, $Al_2O_3$ 2 to 10%, the ratio between the moles of $P_2O_5$ and $Al_2O_3$ being not less than 1.5 to 1 and the content of $Al_2O_3$ being less than 20% by weight of the glass the total impurities being less than 4% of the weight of the glass.

4. Non-toxic glass having as its three essential ingredients alkali metal oxide, $P_2O_5$, and $Al_2O_3$, the relative proportions of the ingredients expressed as mole percent of the total of the three ingredients being $P_2O_5$ from 29 to 30%, alkali metal oxide above 52% and not over 58%, and $Al_2O_3$ from 12 to 19%, the ratio between the moles of $P_2O_5$ and $Al_2O_3$ being not less than 1.5 to 1 and the content of $Al_2O_3$ being less than 20% by weight of the glass the total impurities being less than 4% of the weight of the glass.

5. Non-toxic glass having the composition of claim 1 in which up to 10 mole percent of $P_2O_5$ are replaced by an equal mole percent of $B_2O_3$ without violating the minima of $P_2O_5$, the ratio between the moles of $P_2O_5$ and of $Al_2O_3$ being not less than 1.5 to 1, the content of $Al_2O_3$ being less than 20% by weight of the glass and the content of $B_2O_3$ being less than 10% by weight of the glass.

6. Non-toxic having the composition of claim 1 in which up to 5 mole percent of $P_2O_5$ are replaced by an equal mole percent of $B_2O_3$ without violating the minima of $P_2O_5$, the ratio between the moles of $P_2O_5$ and of $Al_2O_3$ being not less than 1.5 to 1, the content of $Al_2O_3$ being less than 20% by weight of the glass and the content of $B_2O_3$ being less than 10% by weight of the glass.

7. Non-toxic glass having the composition of claim 1 in which up to 5 mole percent of the total of the three essential ingredients is replaced by an equivalent molecular percentage of $R_2O_3$, in which R is a trivalent metal of the group consisting of Fe and Cr, without violating the minima of the three essential ingredients, the ratio between the moles of $P_2O_5$ and of $Al_2O_3$ being not less than 1.5 to 1 and the content of $Al_2O_3$ being less than 20% by weight of the glass.

8. Non-toxic glass havixng the composition of claim 1 in which the alkali metal oxide is sodium oxide.

9. Non-toxic glass having the composition of claim 1 in which the alkali metal oxide is potassium oxide.

10. Non-toxic glass having the composition of claim 1 in which up to 20 mole percent of the total of $P_2O_5$ and alkali metal oxide is replaced by an equal mole percent of a compound having the formula MO in which MO is a divalent metal oxide of the class consisting of CaO, MgO, and ZnO without violating the minima of $P_2O_5$ and of alkali metal oxide, the $Al_2O_3$ content being less than $$\frac{10 \times (100-d)}{100}$$

mole percent when alkali metal oxide is from 25 to 50 mole percent, $d$ being the content of divalent metal oxide in mole percent, the ratio between the moles of $P_2O_5$ and of $Al_2O_3$ being not less than 1.5 to 1, and the content of $Al_2O_3$ being less than 20% by weight of the glass, the total impurities being less than 4% of the weight of the glass.

References Cited by the Examiner

UNITED STATES PATENTS

| | | | |
|---|---|---|---|
| 1,964,629 | 6/1934 | Grimm et al. | 106—47 |
| 2,047,237 | 7/1936 | Updegraff | 207—10 |
| 2,227,082 | 12/1940 | Grimm et al. | 106—47 |
| 2,737,293 | 3/1956 | Beliveau | 207—10 |
| 2,827,393 | 3/1958 | Kadisch et al. | 117—129 |
| 2,866,713 | 12/1958 | Allen | 106—48 |
| 2,920,972 | 1/1960 | Godron | 106—47 |
| 2,971,644 | 2/1961 | Cejournet | 207—10.1 |
| 3,041,201 | 6/1962 | Roelofs | 117—129 |

FOREIGN PATENTS 128,722 of 1960 Russia.

TOBIAS E. LEVOW, *Primary Examiner.*

H. McCARTHY, *Assistant Examiner.*